United States Patent [19]
Wojtowicz et al.

[11] Patent Number: 6,103,205
[45] Date of Patent: Aug. 15, 2000

[54] SIMULTANEOUS MERCURY, $SO_2$, AND $NO_X$ CONTROL BY ADSORPTION ON ACTIVATED CARBON

[75] Inventors: Marek A. Wojtowicz, Simsbury, Conn.; Michael A. Serio, Sturbridge, Mass.

[73] Assignee: Advanced Fuel Research, Inc., East Hartford, Conn.

[21] Appl. No.: 09/111,336

[22] Filed: Jul. 7, 1998

Related U.S. Application Data

[60] Provisional application No. 60/052,279, Jul. 11, 1997.

[51] Int. Cl.$^7$ .................................................. B01D 53/64
[52] U.S. Cl. ................ 423/210; 423/239.1; 423/244.03; 423/449.7; 502/418; 502/437; 95/134; 95/901
[58] Field of Search ............................... 423/210, 244.03, 423/449.7, 234.1; 502/418, 437; 588/215, 216; 95/134, 901

[56] References Cited

U.S. PATENT DOCUMENTS

| | | | |
|---|---|---|---|
| 3,875,077 | 4/1975 | Sanga | 252/425 |
| 4,210,628 | 7/1980 | Ninomiya et al. | 423/239 |
| 4,500,501 | 2/1985 | Hamada et al. | 423/239 |
| 5,607,496 | 3/1997 | Brooks | 75/670 |

FOREIGN PATENT DOCUMENTS

| | | | |
|---|---|---|---|
| 0271618 A1 | 6/1988 | European Pat. Off. | 502/437 |
| 61-238337 | 10/1986 | Japan | 423/210 |
| 2-303520 | 12/1990 | Japan | 423/244.03 |

*Primary Examiner*—Steven P. Griffin
*Assistant Examiner*—Timothy C Vanoy
*Attorney, Agent, or Firm*—Ira S. Dorman

[57] ABSTRACT

Regenerative adsorption of mercury on activated carbons derived from scrap tires enables the removal and recovery of mercury from combustion/incineration flue gas, with concurrent control of $SO_2$ and $NO_x$. Flue gas is used for regeneration of the activated carbon, and mercury stripped from the activated carbon is recovered downstream of the regenerator.

17 Claims, 2 Drawing Sheets

SIMULTANEOUS MERCURY, SO$_2$, AND NO$_x$ CONTROL BY ADSORPTION ON ACTIVATED CARBON

CROSS-REFERENCE TO RELATED PROVISIONAL APPLICATION

This application claims the benefit of provisional application Ser. No. 60/052,279, bearing the foregoing title and filed on Jul. 11, 1997 in the names of the inventors designated herein.

FEDERALLY SPONSORED RESEARCH OR DEVELOPMENT

The United States Government has rights in this invention pursuant to Contract No. DMI-9561810, awarded by the National Science Foundation.

BACKGROUND OF THE INVENTION

In view of the expected tightening of federal, state, and local regulations on heavy-metal emissions, it is imperative that effective abatement methods be developed. Since toxic-waste release will be regulated in gas, solid, and liquid effluents, the newly developed technologies must be regenerative. Furthermore, control of air toxics must be integrated with the existing SO$_2$ and NO$_x$ abatement techniques to form a comprehensive multi-pollutant control system. The high volatility of mercury makes control of this metal particularly difficult; less volatile trace metals readily condense on ash particles, and thus their capture and removal is simpler.

SUMMARY OF THE INVENTION

Accordingly, it is the broad object of the present invention to provide a novel process for the recovery and disposal of mercury present in combustion (which term, as used herein, is inclusive of incineration) flue gas, or any other gas stream, optionally with the simultaneous removal of sulfur dioxide and/or oxides of nitrogen. More specific objects are to provide such a process wherein activated carbon used for mercury adsorption is regenerated, which process is moreover relatively incomplex, economical to carry out, and ecologically advantageous.

As typically practiced, the present innovation will comprise two primary elements: (1) It will employ, as an adsorption medium, activated carbons that are derived from waste tires or other waste products that inherently contain appreciable and desirable amounts of sulfur. (2) The flue gas that is produced by the combustion or incineration operations, of which the process is comprised, will itself be used for mercury stripping and sorbent-regeneration in the mercury recovery operation.

It has now been found that the foregoing and related objects of the invention are attained by the provision of a novel process for the recovery of mercury from a gaseous mixture, comprising the steps:

(a) providing a carbonaceous feedstock having a substantial inherent sulfur content;

(b) effecting pyrolysis and activation of the carbonaceous feedstock so as to produce an activated carbon sorbent having a sulfur content of at least about 3 percent by weight;

(c) passing a first stream of a gaseous mixture containing mercury over the sorbent, at a relatively low temperature, so as to effect adsorption of mercury by the sorbent from the first stream, and thereby to produce therefrom a mercury-bearing sorbent and a stripped gas stream, respectively; and (d) passing a regenerating gas stream over the mercury-bearing sorbent, at a relatively high temperature, substantially above the relatively low temperature, so as to produce therefrom a mercury-rich gas stream and a regenerated sorbent, respectively.

In preferred embodiments the carbonaceous feedstock employed will be a product selected from the group consisting of scrap tires and rubber waste; scrap tires will most desirably be used, and to achieve greatest benefit the conditions of pyrolysis and activation will be such that the sorbent produced therefrom will have a sulfur content of at least about 5 weight percent. Activation of the feedstock will advantageously be carried out in an atmosphere that is substantially free of hydrogen and hydrogen compounds, most beneficially consisting essentially of carbon dioxide. The sorption step (c) of the process will usually be effected at a temperature in the range of about 50° to 200° C., and preferably not above 150° C., and the desorption step (d) will usually be effected at a temperature in the range of about 150° to 800° C., and preferably above 600° C. In especially preferred embodiments the regenerating gas used in carrying out the process will contain a substantial amount of sulfur, so as to provide an increased sulfur content to the regenerated sorbent; the regenerating gas may also contain a substantial amount of oxygen so as to provide an increased level of activation to the regenerated sorbent and/or to produce a quantity of activated carbon sorbent from a previously unactivated pyrolyzed carbonaceous material added to the system. Although coal and other mercury-containing materials may be utilized, the gaseous mixture will, as a practical matter, usually be produced by effecting combustion of a solid or liquid waste material. When the gaseous mixture produced contains a substantial amount of SO$_2$, a second stream thereof may be used as the regenerating gas stream for step (d) of the process.

In certain embodiments of the invention the process is carried cyclically, with portions of the gaseous mixture being passed alternately (as the so-called first and second streams) over the sorbent to adsorb mercury thereupon and to desorb mercury therefrom, respectively. The sorbent may, in such a case, comprise a plurality of separate beds, with a portion of the first stream being passed over one of the beds while a portion of the second stream is passed over another bed, during a first phase of the process cycle, and with the relationship being reversed during a second phase of the cycle. Alternatively, the sorbent may be in the form of a moving bed during the adsorption and desorption steps. The process may be carried out with a portion of the spent or disintegrated sorbent being removed and replaced with a quantity of pyrolyzed carbonaceous feedstock, on a continuous or semicontinuous basis; pyrolyzed feedstock added may or may not be activated, depending upon whether or not the process is carried out so as to effect in situ activation, as described.

Greatest benefit is derived from the process when it includes a step of treating the mercury-rich gas stream to effect removal and recovery of mercury, with or without a further step for controlling the emission of at least one other gas (e.g., SO$_2$ or NO$_x$). To do so the carrier gas stream, stripped of mercury, may be admixed with a solid waste supply and subjected to combustion therewith, or the step may be carried out for the recovery of values from the gas (e.g., sulfur in elemental or combined form).

DETAILED DESCRIPTION OF THE PREFERRED AND ILLUSTRATED EMBODIMENTS

Activated Carbons From Scrap Tires

Figure 1:
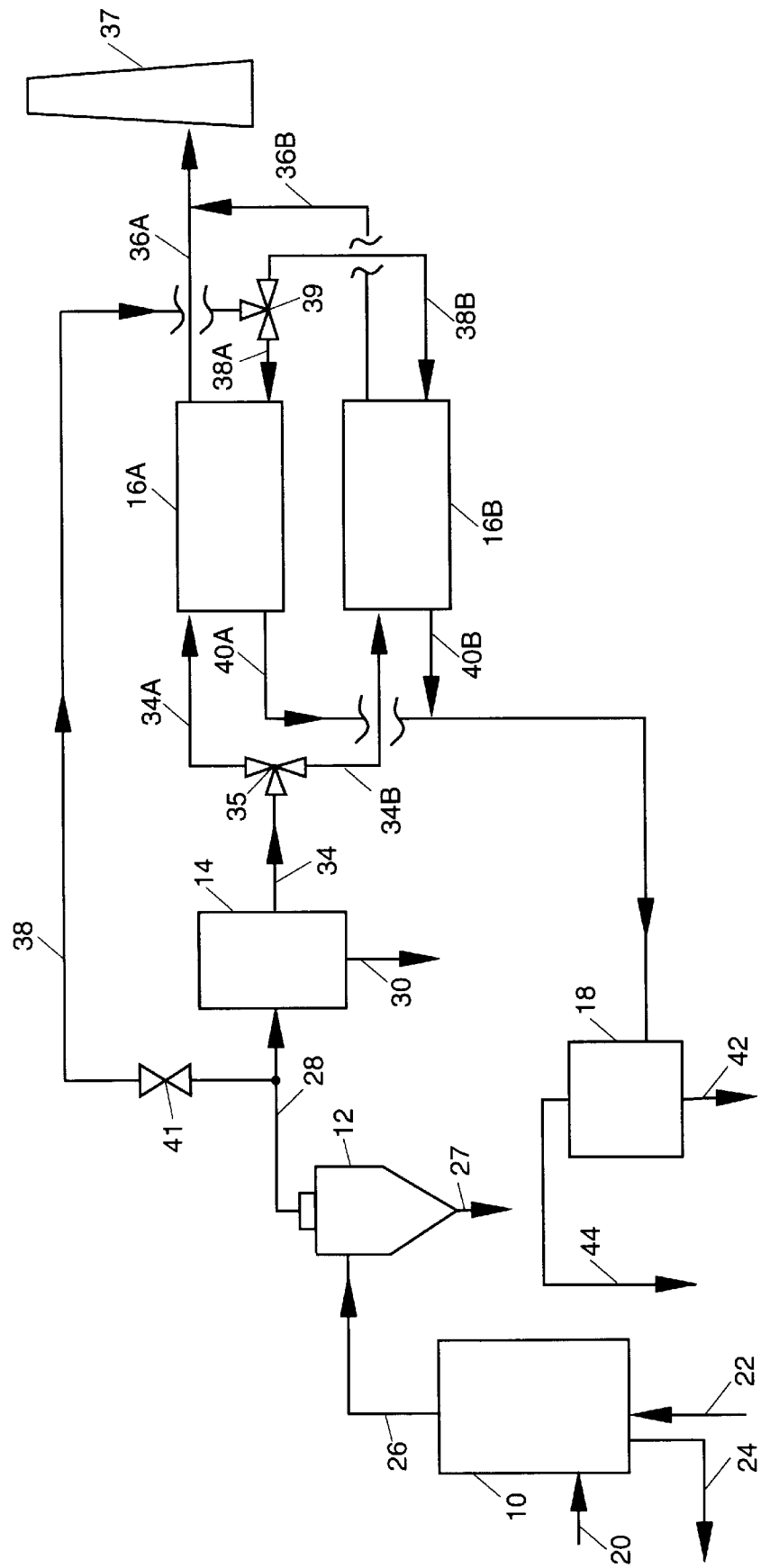
FIG. 1 is a diagrammatic representation of a combustion/incineration plant embodying the present invention.

Mercury is known to react readily with sulfur species, and special types of sulfur-impregnated carbons have previously been used successfully for mercury capture. The high cost (typically, at present, about $5 per pound) of such carbons, however, makes their use prohibitive for many applications. In contrast, activated carbon produced from scrap tires is expected to cost about $0.30 to $0.35 per pound, and thus to compare favorably with the expense of using commodity-grade activated carbons, at a cost of about $0.40 to $0.50 per pound. The cost of the scrap-tire carbon would be even lower if non-activated pyrolysis char is used in a process involving in-situ activation, as herein described.

Since sulfur of course is added to tire rubber during the vulcanization process, the starting scrap-tire material will normally contain 1.1 to 2.1 percent sulfur. Moreover, upon pyrolysis (the first step of traditional activated carbon manufacture), the sulfur concentration increases to about 3.5 percent in the resultant char, and it increases further, to about 5.7 percent, upon activation, provided pyrolysis and activation are both carried out under advantageous conditions. Thus, by producing activated carbon from tire stocks the expensive step of impregnating activated carbon with sulfur, as would otherwise be necessary for the realization of most effective mercury adsorption, is avoided.

The following example describes a process by which a scrap-tire material can be converted to activated carbon of high sulfur content.

EXAMPLE ONE

A packed-bed reactor was used to pyrolyze scrap-tire material, of mean particle size 2.2 mm (8/10 mesh), having an inherent sulfur content of about 1.8 percent by weight. Pyrolysis was carried by heating the tire material from 20° C. to about 730° C. in 80 minutes, following which the furnace was switched off and allowed to cool. The initial sample weight was 97.12 g, and the weights of the collected oils and the residual char were 52.28 g and 35.78 g, respectively; these values correspond to a 53.8 percent yield of oils and a 36.8 percent yield of char.

Char activation was carried out, in the same reactor, using carbon dioxide; a temperature of 922° to 939° C. was maintained for 14.75 hours, producing a burn-off of 50.7 percent. Thermogravimetric FTIR pyrolysis data show that the weight loss reactions are completed at temperatures below 600° C., and that the sample weight loss measured in the activation step was due, therefore, to activation entirely.

Upon elemental analysis it was found that the sulfur content of the scrap-tire material increased from 1.80 percent to 3.5. percent in the pyrolytic char, and increased further to 5.7 percent in the activated carbon. Observations made lead to the conclusion that, although sulfur is lost in the activation step the loss of carbon is faster, with the net result being the enrichment of the char, in sulfur.

The specific surface area of the activated carbon so produced was found to be 613 $m^2/g$. It is expected that more extensive activation would result in further increases in both surface area and also sulfur content. A partial adsorption isotherm for the material indicates the presence of both micro- and meso-porosity.

Mercury-Control Scheme

A capture and recovery scheme for $Hg/SO_2/NO_x$ is shown in FIG. 1 for the case of coal combustion or municipal waste incineration. Although the chemistries of gasification and pyrolysis are different, because those processes are carried out in oxygen-lean environments, it should be appreciated that the methodology herein described can readily be extended to them.

Referring now to FIG. 1 in detail, the system depicted consists of a combustor or incinerator 10, a cyclone separator 12, an electrostatic precipitator 14, a pair of adsorption units 16A and 16B, configured to operate in swing fashion (i.e., in alternating modes), and a mercury recovery unit 18. Each of the units 16A and 16B contains a quantity of the scrap tire-derived activated carbon sorbent described herein; although not illustrated, it will be appreciated that means are provided for removing disintegrated sorbent from the units, and for adding fresh material to replenish the supply.

The feedstock employed is introduced into the unit 10 through line 20, and an appropriate supply of air is introduced through line 22. Solid products of combustion or incineration (as the case may be) are withdrawn through line 24, with the gaseous products passing outwardly of the unit 10 through line 26 and into the cyclone separator 12. Fly ash is withdrawn from the separator 12 through line 27, and the cleansed gaseous product is conveyed through line 28 to the electrostatic precipitator 14 for removal of any residual ash, which is discharged through line 30. The fully cleansed flue gas passes through line 34 and, depending upon the position of a two-way valve 35, into either of its branches 34A or 34B. Branch 34A leads to the adsorption unit 16A, with the processed gas passing therefrom through line 36A to the stack 37; the flue gas passing through branch 34B to the unit 16B exits therefrom to the stack 37 through line 36B.

To facilitate mercury sorption, and to counteract the high volatility of mercurial compounds, relatively low-temperature conditions (50° to 150° C.) are envisaged for the adsorption step. Such temperatures will typically prevail in the flue gas directly before the stack 37, which is therefore the preferred position for the mercury adsorption units 16A and 16B.

Depending upon whether or not the valve 41 is open, a portion of the hot gas exiting the cyclone separator 12 is caused to flow through line 38. At the two-way valve 39, gas in line 38 is directed through either branch 38A into unit 16A, or through branch 38B into unit 16B. It will be appreciated that when the gas from line 34 is directed to unit 16A the gas from line 38 will be directed through line 38B to unit 16B, and vice versa.

In either alternative configuration, the flue gas flowing through branch 38A or 38B serves to strip mercury from the activated carbon material contained in the corresponding unit 16A or 16B, and exits along either the branch 40A or 40B to the mercury recovery unit 18. Recovered mercury is removed through line 42, and the stripped carrier flue gas, removed through line 44, will itself beneficially be processed for the recovery of $SO_2$, which is present therein at a relatively high concentration; further processing of this stream may however be avoided by recycling it to the unit 10, with the introduction thereinto of a material such as solid limestone. The same is true of $NO_x$, except that some portion of the gas will be converted to $N_2$ in the desorption (stripping) step. It should be emphasized that FIG. 1 is only a diagrammatic representation of one embodiment of the process, and that additional and more specific features, and alternative arrangements, are certainly feasible and will be evident to those skilled in the art.

Figure 2:
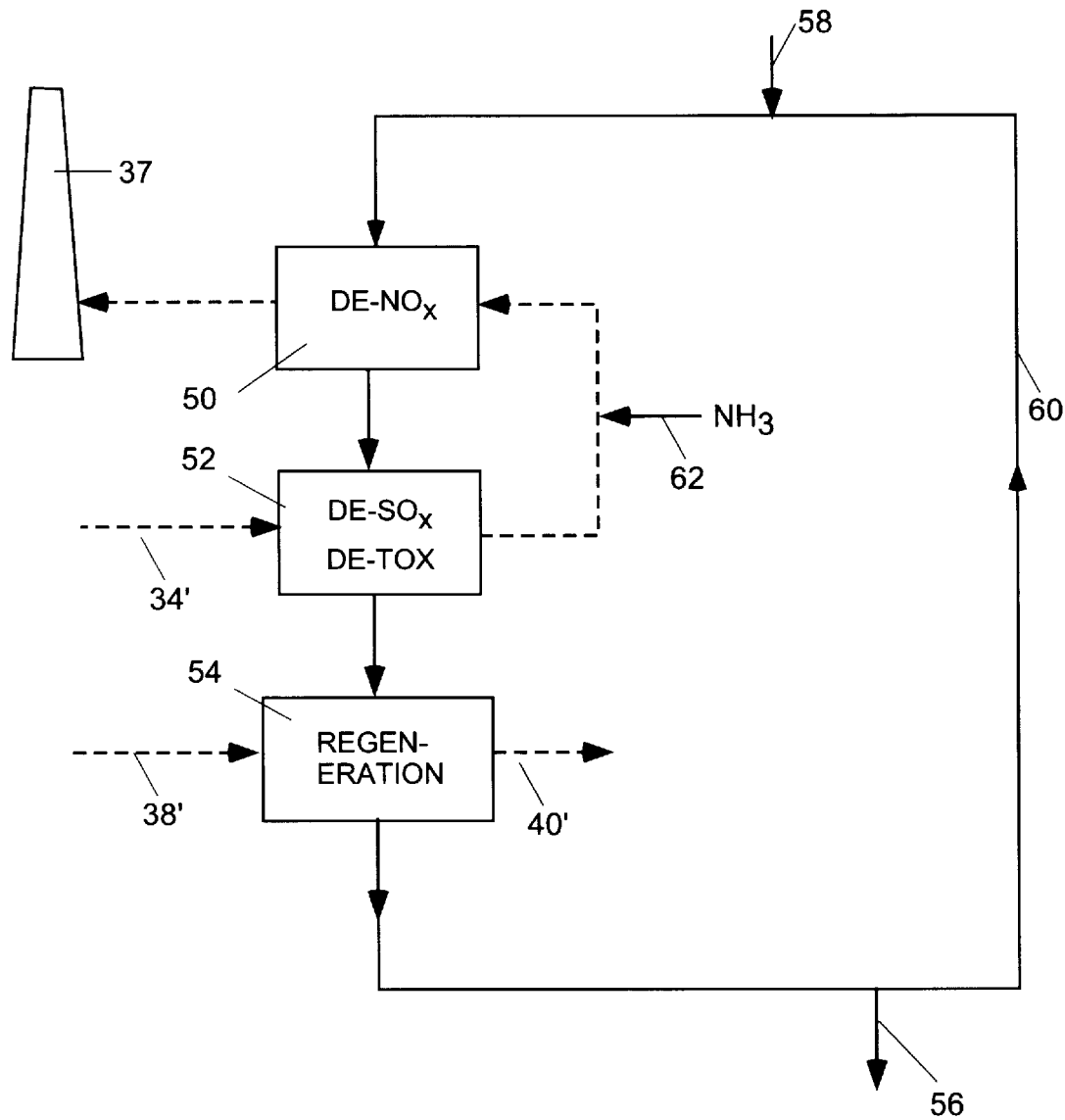
FIG. 2 is a flow diagram showing features of a moving sorbent bed embodiment of the invention.

For example, FIG. 2 depicts features of a continuous moving-bed reactor system embodying the invention, wherein a bed of activated carbon sorbent moves seriatim through units 50, 52, and 54 (which may be vertical zones or stages of a single unit) for the removal of $NO_x$ (DE-$NO_x$) and $SO_x$ and mercury (DE-$SO_x$, DE-TOX), and for regeneration, respectively, with fines withdrawal and make-up sorbent additions being effected (continuously or semicontinuously) at suitable locations 56 and 58 along the loop 60 of sorbent movement. The flue gas supplied is introduced through line 34' at the DE-$SO_x$ DE-TOX stage 52; it is passed, with a charge of $NH_3$ added at 62, to the DE-$NO_x$ stage 50, and then to the stack 37 for discharge. A hot flue gas slip stream (having a volume that is typically orders of magnitude less than the main flue gas stream) is introduced through line 38' for passage through the sorbent bed in the regeneration stage 54, to effect recovery through line 40' of and $SO_2$-rich and mercury-rich gas, which will normally be subjected to further processing (by means not shown).

The use of a flow of hot flue gas to effect high-temperature stripping of Hg, $SO_2$, and $NO_x$ from the sorbent surface, in the manner described, is regarded to be a unique measure irrespective of the particular sorbent involved or the source thereof. Stripping/regeneration temperatures can easily be adjusted and controlled by mixing streams of hot and cool flue gas in appropriate proportions; depending on the particular sorbent material used, the stripping/regeneration temperature may be as low as 150° C. or as high 600° C. If a relatively low regeneration temperature (e.g. 300° C.) is sufficient, and if a hot-side electrostatic precipitator (i.e., one operating at about 350° C.) is used, the hot gas for regeneration may be withdrawn downstream of the precipitation step so as to avoid potential problems associated with entrained particles; hot-gas filtration may also be used, if needed or so desired.

In addition to effecting thermal stripping, the flow of flue gas through the adsorption units 16A, 16B, 54, in the regeneration mode, makes it possible to replenish, as an optional (albeit desirable) step, sulfur on the sorbent surface, which may for example be depleted by the desorption of mercury as HgS. The sulfur needed for this purpose is advantageously supplied by $SO_2$ contained in the combustion effluent. It should be appreciated that sorbent regeneration via sulfation of the surface may require an additional low-temperature step following Hg/$SO_2$/$NO_x$ stripping.

The use of a mercury recovery unit, downstream of a regenerator unit, is well-known in the art. Such units, which usually function on the cold mercury trap principle, are conventionally employed, for example, in plants for recovering concentrated mercury from waste batteries, industrial and municipal wastes and sludges, industrial scrap, brine, etc.

$SO_2$ and $NO_x$ Sorption

The reactions of oxides of nitrogen with carbon offer attractive means for reducing $NO_x$ to molecular nitrogen; consequently, these reactions have been studied extensively and the resultant volume of literature on the subject is enormous. Although the consensus is that carbonaceous sorbents are reactive with respect to NO adsorption and reduction to $N_2$, the mechanisms involved are not entirely clear. For present purposes it is sufficient to appreciate that $NO_x$ can be adsorbed readily on carbonaceous sorbents and that, due to the unique configuration of the instant system, the nature of the desorption products is believed to be non-critical to the success of the disclosed method.

The facility with which $NO_x$ adsorbs on carbon surfaces has previously been exploited for flue gas cleanup processes. One such process involves simultaneous $SO_2$ and $NO_x$ adsorption on a special type of coke in a moving-bed arrangement, with $SO_2$ being thermally desorbed and leaving the system with a gas stream containing about 20 percent $SO_2$; elemental sulfur can also be recovered as a product. Again however, the important point to appreciate is that $SO_2$ can be adsorbed readily on activated carbon and that, under the preferred process conditions contemplated for practicing the present invention (i.e., the presence of $O_2$), $SO_2$ will be the desorption product.

In summary, the following constitute substantial advantages, over the prior art, that are afforded by the instant process: The process provides a regenerative mercury-control measure that generates no secondary wastes; it enables efficient Hg/$SO_2$/$NO_x$ adsorption at low temperatures; sulfur present in the combusted fuel may be used to some extent as an active sorbent component, and may be cycled during adsorption/stripping/regeneration phases; the use of the combustion/incineration flue gas for regeneration enables simple, convenient, and inexpensive operation; flue-gas recycling may contribute to a lowering of $NO_x$ emissions; a post-consumer waste material (i.e., scrap tires, medical and industrial waste, and other appropriate sulfur-containing materials) is utilized for producing the mercury sorbent; a concentrated stream of mercury is recovered as a by-product; and regeneration temperatures are easily controlled.

Among the factors that give rise to the advantages that are realized by practice of the invention are the following: Activated carbon derived from scrap tires has been shown to have good mercury-sorption capacity at relatively low temperatures (e.g., 100° C.), as well as being of low cost and exhibiting satisfactory regenerative properties. Mercury sorption is strongly enhanced by oxidizing environments, i.e., $O_2$ and NO, with NO having the stronger effect. Retention of mercury increases as partial pressures of $O_2$ and NO increase; and it appears to be necessary that both NO and $O_2$ be present for NO to augment mercury sorption. Adsorbed mercury forms surface complexes with adsorbed $O_2$, NO, and possibly $SO_2$ as well. The state of the carbon surface, and in particular the inventory of surface species, appears to be critical to good mercury-sorption performance. Regeneration by flue gas is feasible and, although the carbon loses some of its initial reactivity, it is later regained through exposure to $O_2$, NO, and $SO_2$. The sorption-regeneration process can be optimized to take advantage of the best possible surface reactivity.

It is believed that the instant process is entirely feasible for use on a commercial basis. This is attributable largely to the high mercury-removal efficiency realized, combined with the improved $SO_2$ and $NO_x$ control afforded and the simplicity and relatively low cost of operation. The disclosed scheme is based on proven and reliable technological principles and components, such as fixed-bed and moving bed adsorption, swing operation, regeneration, etc., which are integrated into a self-contained process. The process is amenable to further development, such as to include the control and/or recovery of other pollutants (e.g., other volatile air toxics, $N_2O$, etc.). Applications for the process include coal-fired power plants, municipal-, medical-, and hazardous-waste incinerators, and the like.

As far as is known, no commercial technology is presently available in the United States to efficiently remove mercury from combustion gases. There are several commercial technologies available for $NO_x$ and $SO_2$ removal, but they are usually separate; e.g., wet scrubbers for $SO_2$, and selective catalytic reduction (SCR) for $NO_x$. Moreover, most techniques that have heretofore been suggested for mercury removal are non-regenerative. The use of scrap-derived activated carbons leads to reduced materials costs while also having important environmental implications, such as the potential for creating a market for a material that currently constitutes a source of substantial solid waste. Further commercial advantages are afforded by the ability to reduce mercury, in addition to $NO_x$ and $SO_2$, in a single plant.

Thus, it can be seen that the present invention provides a novel process for the recovery and disposal of mercury that is present in combustion/incineration flue gas as well as in other gas streams, with the possible simultaneous removal of sulfur dioxide and oxides of nitrogen. The activated carbon that is used for mercury adsorption can be regenerated repeatedly, albeit that it is eventually consumed by exposure to residual oxygen present in the flue gas. The process itself is relatively incomplex and economical to carry out, and ecologically advantageous.

Having thus described the invention, what is claimed is:

1. A process for the recovery of mercury from a gaseous mixture, comprising the steps:
   (a) providing a carbonaceous feedstock having a substantial inherent sulfur content;
   (b) effecting pyrolysis and activation of said carbonaceous feedstock so as to produce an activated carbon sorbent having a sulfur content of at least about 3 percent by weight;
   (c) passing a first stream of an impure gaseous mixture containing mercury through said sorbent, at a temperature in the range of about 50° C. to about 200° C., so as to effect adsorption of mercury by said sorbent from said first stream, and thereby to produce therefrom a mercury-bearing sorbent and a stripped gas stream, respectively; and
   (d) passing a second stream of an impure gaseous mixture, as a regenerating gas stream, through said mercury-bearing sorbent at a temperature which is in the range of about 150° C. to about 800° C. and which is also above the temperature at which said first stream passes through said sorbent, so as to produce therefrom a mercury-rich gas stream and a regenerated sorbent, respectively.

2. The method of claim 1 wherein said carbonaceous feed stock is a waste product selected from the group consisting of scrap tires and rubber waste.

3. The method of claim 2 wherein said feedstock comprises scrap tires, and wherein said sorbent produced therefrom has a sulfur content of at least about 5 weight percent.

4. The process of claim 1 wherein the activation of said feedstock, in said step (b), is carried out in an atmosphere that is substantially free of hydrogen and hydrogen compounds.

5. The process of claim 4 wherein said activation in said step (b) is carried out in an atmosphere that consists essentially of carbon dioxide.

6. The process of claim 1 wherein said regenerating gas provides an increased sulfur content to said regenerated sorbent.

7. The process of claim 6 wherein said gaseous mixture contains a substantial amount of $SO_2$.

8. The process of claim 1 wherein said regenerating gas contains a substantial amount of at least one of oxygen and $NO_x$, and provides an increased level of activation to said regenerated sorbent.

9. A process for the recovery of mercury from a gaseous mixture, comprising the steps:
   (a) providing an activated sorbent having a sulfur content of at least about 3 percent by weight;
   (b) passing a first stream of an impure gaseous mixture containing mercury through said sorbent, at a temperature in the range of about 50° C. to about 200° C., so as to effect adsorption of mercury by said sorbent from said first stream, and thereby to produce therefrom a mercury-bearing sorbent and a stripped gas stream, respectively; and
   (c) passing a second stream of an impure gaseous mixture, as a regenerating gas stream, through said mercury-bearing sorbent at a temperature which is in the range of about 150° C. to about 800° C. and which is also above the temperature at which said first stream passes through said sorbent, so as to produce therefrom a mercury-rich gas stream and a regenerated sorbent, respectively.

10. The process of claim 9 including the further step of effecting combustion of a waste material to produce said gaseous mixture.

11. The process of claim 9 wherein said gaseous mixture contains a substantial amount of at least one species selected from the group consisting of $SO_2$, oxygen and $NO_x$.

12. The process of claim 9 wherein said first stream is passed through said sorbent in one direction and said second stream is passed through said sorbent in the opposite direction.

13. The process of claim 9 wherein said process is carried out cyclically, with portions of said gaseous mixture being passed alternately, as said first stream and said second stream, through said sorbent to alternately adsorb mercury upon, and desorb mercury from, said sorbent.

14. The process of claim 13 wherein said sorbent comprises a plurality of separate sorbent beds; wherein during a first phase of the process cycle said first stream is passed through one of said sorbent beds while said second stream is passed through another of said sorbent beds; and wherein during a second phase of said cycle said first stream is passed through said another sorbent bed while said second stream is passed through said one sorbent bed.

15. The process of claim 9 wherein, on at least a semi-continuous basis, a portion of said sorbent is removed and is replaced by a quantity of a carbonaceous feedstock that has been at least pyrolyzed.

16. The process of claim 9 including the further step of treating the mercury-rich gas resulting from the regeneration of the sorbent to effect removal and recovery of mercury therefrom.

17. The process of claim 16, further comprising the step of treating the mercury-stripped gas that has been previously used to regenerate the sorbent to remove the sulfur dioxide out of the mercury-stripped gas.

\* \* \* \* \*

UNITED STATES PATENT AND TRADEMARK OFFICE
CERTIFICATE OF CORRECTION

PATENT NO.   : 6,103,205
DATED        : August 15, 2000
INVENTOR(S)  : Marek A. Wójtowicz and Michael Serio It is certified that error appears in the above-indentified patent and that said Letters Patent is hereby corrected as shown below:

On the cover page of the patent, the name of the inventor Marek A. Wójtowicz is spelled incorrectly. The correct spelling requires the diacritical mark over the first "o".

Signed and Sealed this

Tenth Day of April, 2001

Attest:

NICHOLAS P. GODICI

Attesting Officer      Acting Director of the United States Patent and Trademark Office